United States Patent [19]
Kurtin

[11] Patent Number: 5,138,494
[45] Date of Patent: Aug. 11, 1992

[54] VARIABLE FOCAL LENGTH LENS

[76] Inventor: Stephen Kurtin, 3835 Kingswood Rd., Sherman Oaks, Calif. 91403

[21] Appl. No.: 519,939
[22] Filed: May 7, 1990
[51] Int. Cl.$^5$ .......................... G02B 1/06; G02C 1/00
[52] U.S. Cl. .................... 359/666; 359/665; 359/832; 351/158
[58] Field of Search .............. 350/418–419, 350/409, 412, 417–419, 424, 436; 351/41, 159, 161, 168, 169; 359/508–588, 601–614, 642, 665, 666, 672, 678, 722, 831, 832, 886

[56] References Cited
U.S. PATENT DOCUMENTS

| | | | |
|---|---|---|---|
| 3,598,479 | 8/1971 | Wright | 351/159 |
| 3,614,215 | 10/1971 | Mackta | 351/41 |
| 4,174,156 | 11/1979 | Glorieux | 350/419 |
| 4,261,655 | 4/1981 | Honigsbaum | 351/41 |
| 4,286,839 | 9/1981 | Ilzig et al. | 350/418 |
| 4,300,818 | 11/1981 | Schachar | 351/159 |
| 4,444,471 | 4/1984 | Ford, Jr. et al. | 350/419 |
| 4,477,158 | 10/1984 | Pollock et al. | 351/169 |
| 4,913,536 | 4/1990 | Barnea | 350/419 |

OTHER PUBLICATIONS
"A Variable Focus Lens and Its Uses"-Graham J. Opt. Soc. of Amer., vol. 30, Nov., 1940 pp. 560–563.

Primary Examiner—Bruce Y. Arnold
Assistant Examiner—Thong Nguyen
Attorney, Agent, or Firm—Saul Epstein

[57] ABSTRACT

A variable focal length lens, for use in spectacles, which includes one or two rigid lenses to provide the wearer's distance correction, and a liquid filled lens bounded by a distensible stretched elastomeric membrane to provide a variable near addition. The liquid, which has a fixed volume, is stored in the field of view between the elastomeric membrane and one of the rigid lenses. Variation of the optical power of the liquid filled lens in one embodiment is achieved by displacement of the outer periphery of the stretched elastomeric membrane. In a second embodiment, both the optical power and the prismatic power of the liquid lens is varied by changing the angle between the membrane support and the rigid lens.

18 Claims, 2 Drawing Sheets

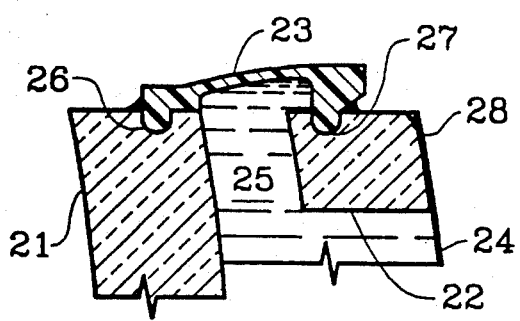
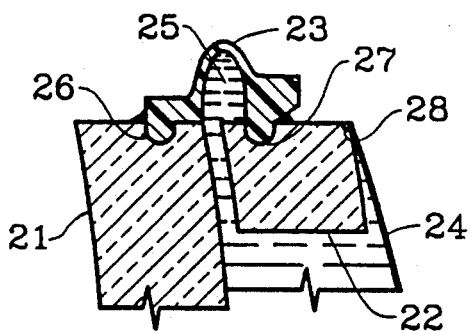
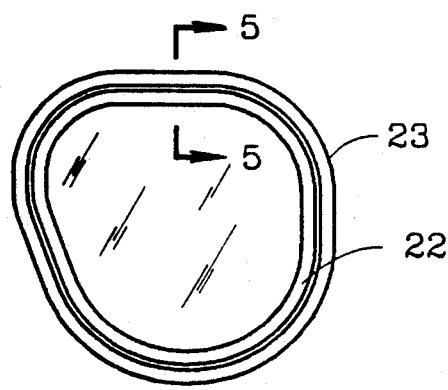
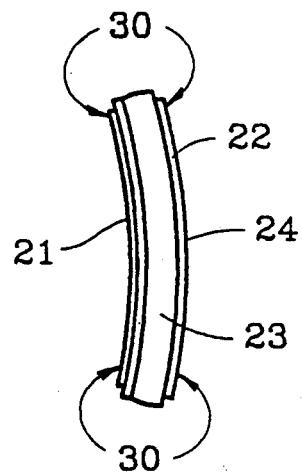
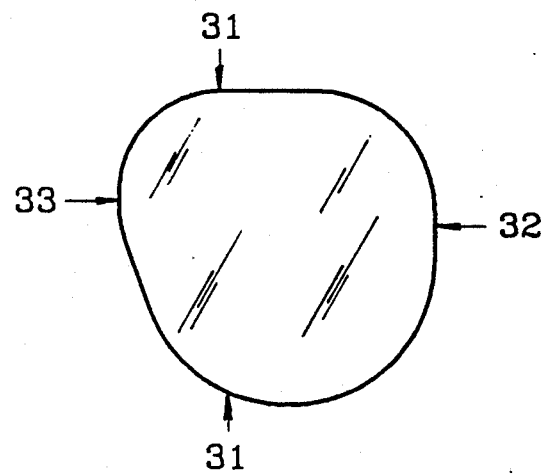

VARIABLE FOCAL LENGTH LENS

BACKGROUND OF THE INVENTION

This invention relates to variable focal length lenses. There is a need for such lenses as spectacle lenses due to a well known effect of aging on the human eye. As a result of aging, the lens in the human eye becomes less elastic and incapable of sufficient accommodation to focus on near or intermediate objects. For this reason, by age forty five most people require spectacles to achieve clear vision at close or intermediate distances. After the onset of the condition of limited focal accommodation, called presbyopia, a single set of fixed focus spectacles will be found to be unsatisfactory for both distant and near vision, irrespective of the wearer's general visual acuity. Whatever correction (if any) may be required to correct a person's vision for distance, an additional amount of optical power (up to three or four diopters) will be found to be required to correct that person's eyesight for near vision. The required "near addition" generally does not involve an astigmatic component.

The usual solution to this problem is to fit persons suffering from presbyopia with spectacles having bifocal lenses. In the most common form of bifocal lens, the upper part is ground to provide the wearer with the proper correction (if any is needed) for distance vision, and the lower part is ground with the same correction, plus a relatively small near addition. The near addition generally does not exceed a few diopters of optical power. Using bifocal lenses in a pair of spectacles allows a person to see distant objects clearly by looking straight ahead, and to see close objects clearly by looking downward.

The bifocal solution is not entirely satisfactory for at least three reasons. Firstly, many people have difficulty in adapting to bifocals; secondly, there is often the need to see near objects which are on a level with, or above, the wearer; and finally, there is usually a mid distance at which neither part of the lens is satisfactory. Trifocals or progressive multifocal lenses are used to help alleviate this latter problem, but the first two difficulties remain, and in addition, the in-focus field of view may be more limited than is desired.

There have been many attempts to devise a variable focal length lens which could be used in spectacles, but until the present invention, none has been practical. The concept of using a flexible fluid filled lens to achieve a variable focal length dates back to about 1890, but despite much effort since, no practical lens has been devised. The early work in this area was described in an article appearing in the November, 1940 issue of the Journal of the Optical Society of America, pp 560–563. The author of this article discussed the prior designs as being of two general types. The first employed two thin spherical glass segments whose edges were held together by a circumferential ring, and the enclosed space filled with a clear liquid. To change the focal length of the lens, the ring was contracted diametrally by squeezing the glass segments with a constricting or sphincter-like action, thereby altering the curvature of the lens surfaces. The second type of variable focal length lens described consisted of a sandwich of two thin spaced flat sheets with a clear liquid filling. Forcing additional liquid into the sandwich caused bowing of the sheets and varied the focal length of the lens. One problem common to both of these prior art designs, according to the author of the article, was that they resulted in distorted lens surfaces.

Examples of more recent attempts to devise a practical variable focal length lens for spectacle use are described in U.S. Pat. Nos. 3,598,479, 3,614,215, and 4,261,655. None proved successful. It is noted that the area of the variable focal length portion of the lenses in both the '479 and '655 patents has been severely restricted. The inventor of the '479 patent refers to the practical necessity of storing and pumping sufficient liquid to make the system functional as limiting the feasible diameter of his variable focal length lens. The same limitation would apply to the lens described in the '655 patent. Another shortcoming (applicable to all three examples) is that the liquid is of necessity ducted or piped through one or more joints in the spectacle assembly, creating the likelihood of leaks. Finally, the use of glass as a flexible membrane as disclosed in the '479 patent, because of its limited strain capability, also limits the size of the lens.

The present invention overcomes the deficiencies mentioned above, and provides a long sought practical and economical solution to the problem of varying the focal length of a spectacle lens.

SUMMARY OF THE INVENTION

The present invention involves providing the prospective wearer's basic ophthalmic prescription using conventional rigid lenses, i.e., lenses fabricated from glass or plastic. Depending on the embodiment, each variable focus lens may include one or two rigid lenses. A variable near addition is provided by a lens consisting of a small volume of clear liquid bounded on one side by one of the rigid lenses, and on the other by a thin transparent elastomeric film. There is a fixed volume of liquid in the system, virtually all of which is at all times in the field of view. The curvature of the liquid lens surface bounded by the elastomeric film, and hence the optical power of the entire lens assembly, is varied by varying the distance between the periphery of the elastomeric film and one of the rigid lenses in the system. Moving the periphery of the elastomeric film causes the liquid within the lens assembly to be redistributed such that the curvature of the film is changed.

One embodiment of the present invention includes two spaced rigid lenses joined at their periphery with a flexible seal. The seal prevents liquid from leaking out, but allows some motion between the lenses generally in the direction of the optical axis. A thin transparent elastomeric film is stretched across the front of the front lens and is sealed to it around the periphery. The space between the lenses is filled with a clear liquid. The front surface of the front rigid lens may be spherical, as is common practice in spectacle lenses, and holes are provided through it to allow liquid flow. The rigid lenses are ground so that the assembly (with the elastomeric film against, or nearly against, the front rigid lens) provides the wearer with the proper correction (if any) to permit clear vision at distance. When the two rigid lenses are moved closer together, the liquid between them will flow through the holes in the front lens and distend the elastomeric film. As the elastomeric film distends, a positive lens is created, adding a near addition to the lens system. The closer the two rigid lenses are moved, the greater will be the near addition.

An important feature of this invention is the use of an elastomeric film as the flexible cover for the liquid lens.

In particular, saran, a copolymer of vinylidene chloride and vinyl chloride, has been found to have the combination of characteristics which makes it particularly well suited for this application. Elastomers in general, and saran in particular, are capable of relatively enormous strains within their elastic ranges, and also have a large region where the stress/strain curve is almost horizontal, i.e., where increasing strain results in little additional stress. These characteristics allow a variable lens of spectacle size to be made which has the required range in optical power and which does not require excessive force to operate. In order to form an adequately undistorted image, the film bounding the liquid lens must at all times be in tension and must respond rapidly to changes in fluid pressure against it. Saran, in particular, exhibits a rapid recovery after being subject to a large strain.

In a second embodiment, the front lens of the first embodiment is replaced by an annular rim to which the stretched elastomeric film is fastened. The rim is joined to the rear lens in the same manner as in the first embodiment. As the rim is moved toward the rear lens, the elastomeric film distends and a variable focal length lens is created.

A better and more complete understanding of the invention may had by referring to the following detailed description taken together with the appended drawings.

BRIEF DESCRIPTION OF THE DRAWINGS

FIG. 5 is an enlarged fragmentary cross section of a second embodiment of the present invention taken at 5—5 of FIG. 7, the lens elements being positioned for distance sight.

FIG. 6 is an enlarged fragmentary cross section taken at the same section as FIG. 5 but with the lens elements being positioned for near sight.

FIG. 7 is a front view of a left eye spectacle lens according to a second embodiment of the present invention.

FIG. 8 is a left side view of the lens shown in FIG. 7.

FIG. 9 is a front view of a left eye spectacle lens according to the invention showing the relative location of the pivot and actuating points used to shift the optical center of the liquid lens concurrently with a change in optical power of the lens.

DETAILED DESCRIPTION OF THE INVENTION

Figure 1:
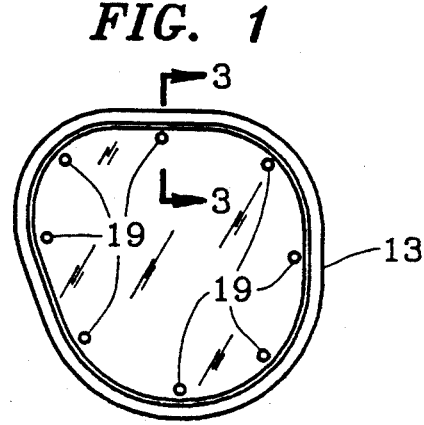
FIG. 1 is a front view of a left eye spectacle lens according to a first embodiment of the present invention.
Figure 2:
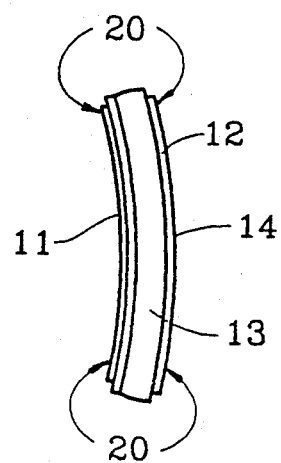
FIG. 2 is a left side view of the lens shown in FIG. 1.

The components of the invented variable focal length lens, in accordance with a first disclosed embodiment (as illustrated in FIGS. 1 through 4) are: a rigid rear lens 11, a rigid front lens 12, a flexible seal 13, a transparent elastomeric membrane 14, and a transparent liquid filling 15. The liquid filling is preferably a substance which is benign in the sense that if it were to come into contact with the eye through some accident, no ill effects will ensue. Water is a satisfactory substance, however, other liquids may be used if desired. It may, for example, be desirable to use a liquid with a higher index of refraction to minimize the amount of liquid in the system, or a liquid with a lower freezing point to protect against freezing.

Figure 4:
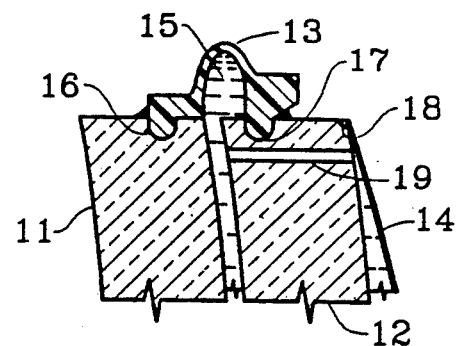
FIG. 4 is an enlarged fragmentary cross section taken at the same section as FIG. 3 but with the lens elements being positioned for near sight.

It may be convenient, but it is not a requirement, that the front surface of the rear lens and the rear surface of the front lens be ground to be mating surfaces. So doing allows the spacing between the two lenses to approach zero when the maximum near vision correction is added as illustrated in FIG. 4. Additionally, if these surfaces have identical shapes, the intervening liquid does not much affect the overall optical characteristics of the assembly, and may not need to be considered when determining the form of the other surfaces. The rigid lens surfaces are ground such that the combination of lenses, with the liquid filling between them, and the membrane either flat against the front lens, or slightly distended, provides the proper distance vision correction for the wearer. The front surface of the front lens may be spherical, as is common practice for spectacles, and, as will be discussed below, it is preferred that the membrane be slightly distended when the lens is set for distance vision.

A plurality of holes 19 through the front lens 12 are located near its outer circumference. These holes provide a path for the filling liquid to flow from between the rigid lenses to the front of lens 12 when the lens assembly is squeezed. The seal 13, which may be made of rubber or a rubberlike compound, is continuous around the lens assembly and is bonded to the front and rear lenses using an adhesive. Grooves 16 and 17 around the outer circumferences of the lenses provide locating points.

The membrane 14 is fabricated from a transparent elastomer, preferably saran, and is bonded at its outer circumference to the front lens 12. The thickness of the saran membrane is not critical; a thickness of 0.75 mils has been found satisfactory. A convenient way of making the bond between the membrane 14 and the lens 12 is to cut a groove 18 around the lens at its periphery, and to lay a bead of adhesive in the groove prior to pressing the lens against a stretched saran membrane. After the adhesive cures, the excess membrane material may be trimmed off, leaving a membrane 14 in tension against the lens. Initial tension in the membrane tends to cause the curvature of the membrane to assume a substantially spherical shape when it is distended, even for small deflections.

Figure 3:
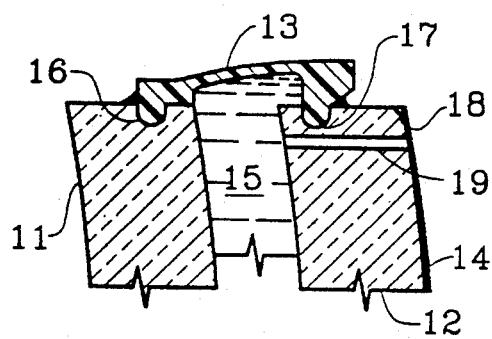
FIG. 3 is an enlarged fragmentary cross section taken at 3—3 of FIG. 1, the lens elements being positioned for distance sight.

FIG. 3 illustrates the relative positions of the elements when the lens is set for distance vision. The two rigid lenses are separated such that the liquid is all, or almost all, between them, and little or no liquid is between the front lens and the membrane. It is preferable, however, that under this condition the membrane be distended slightly (i.e., that there be at least some liquid between the membrane and the front rigid lens). There are several reasons for this preference. Firstly, if the membrane is allowed to seat against the lens some liquid could possibly be trapped in isolated pockets as the membrane seats. If this happens, the membrane will not follow the underlying lens surface and there will be some distortion of distance vision. Also, the membrane is less likely to be damaged by external objects when it is not against the rigid lens, and small solid particles in the liquid (left by inadvertence during assembly or breaking off later) could damage the membrane if they were to lodge between the membrane and the rigid lens.

In order to achieve the configuration of FIG. 4 (the position for near sight) an actuating mechanism, shown schematically at numeral 20, must be provided to squeeze the lenses 11 and 12 together. That is, compressive force must be applied, preferably at several places around the circumference of the assembly, to change the relative positions of the rigid lenses from that shown in FIG. 3 to that shown in FIG. 4. When the compressive force on the rigid lenses is relaxed, because of the pressure in the liquid caused by the tension in the membrane 14, the assembly reverts to the configuration of FIG. 3. Alternatively, the actuating mechanism 20 may be designed to not rely on internal forces tending to expand the lens assembly, but to positively move the lenses 11 and 12 in both directions. Whichever type of mechanism is used, in order to minimize distortion, the membrane should at all times be in tension.

In the configuration shown in FIG. 4, the lens assembly has been compressed (by the actuating mechanism 20), reducing the spacing between the front and rear rigid lenses. Most of the liquid which was between the front and rear lenses has been displaced and is now in front of the front lens, distending the membrane. The stretched elastomeric membrane, distended by the liquid pressure behind it, assumes a substantially spherical shape, and thus the liquid acts as an additional positive lens. The optical power of this lens depends on the refractive index of the liquid and the curvature of the membrane.

An enlarged fragmentary cross section of a second embodiment of the invented variable focal length lens is shown in FIG. 5. The components of this embodiment are: a rigid rear lens 21, a rigid rim 22, a flexible seal 23, a membrane 24, and a transparent liquid filling 25. As can be seen in the front view of FIG. 7, the rim 22 is a thin annular element. It provides the strength and form needed to support membrane 24, but does not extend across the field of view as does the rigid lens 12 of the first embodiment. Since it need not be transparent, the rim 22 can be made of steel or other high strength material. The elements as shown in FIG. 5 are positioned for distance sight, i.e., with the rim 22 positioned most distant from the rear lens 21. For cosmetic reasons, and to provide a significant restoring force tending to return the system to its distance configuration, it is preferred that the membrane 24 be somewhat distended in this condition. The rigid lens 21 is ground so that it, in conjunction with the liquid lens formed by liquid 25, when the elements are in the position of FIG. 5, provide the basic ophthalmic prescription of the wearer for distance.

Similar to the first embodiment, seal 23 is positioned by grooves 26 and 27 and is adhesively bonded to the rear lens 21 and to the rim 22. The membrane 24 is stretched and bonded to the rim 22 by adhesive in groove 28.

To adjust the lens for near vision, the rim 22 is pushed toward lens 21 (using actuating mechanism 30). This causes the liquid in the region of the periphery of the membrane 24 to migrate toward the center of the assembly, distending the membrane further. As before, the radius of curvature of the membrane depends on the amount that the lens assembly has been compressed. The liquid behind the membrane therefore becomes a variable focal length lens. The relative positions of the elements in the near vision configuration is shown in FIG. 6.

Depending on the outline shape and placement of the lenses, and the power of the near addition, spectacles with lenses made according to the foregoing description may or may not be satisfactory, due to decentration effects. No method has been disclosed above to assure that the optical center of the liquid lens is aligned with the pupil of the prospective wearer. Hence, since the shape, size and placement of spectacle lenses are ordinarily selected to suit individual stylistic taste rather than for optical convenience, it will usually not be possible to center the liquid lenses on the pupils. In most spectacles the distance between the optical centers of the liquid lenses will be found to be greater than the user's interpupillary distance. An additional factor is that the eyes turn in when viewing near objects, which exacerbates the decentration problem. If the power of the near addition is small, the effect of decentration may not be serious, but for larger additions, eyestrain or even double vision may be induced.

In accordance with an additional aspect of the present invention, a prismatic correction to compensate for decentration of the liquid lens may be achieved by adding a liquid prism whose power increases as the power of the liquid lens increases. This prism is created by making the amount of squeeze between the membrane support (rim 22 or lens 12) and the rear lens (21 or 11) non uniform. That is, by holding the space between the membrane support and the rear lens fixed at spaced pivots or hinges 31 and applying the actuating force (using actuating mechanism 20 or 30) at point 32 only. The membrane support then pivots around the line connecting pivots or hinges 31. This motion, in addition to causing the membrane to bulge outward to create a positive lens, causes a change in the angle between the plane of the membrane support and the plane of the rigid lens, creating a base-in liquid prism whose power increases as the power of the liquid lens increases. A base-in prism will compensate for outward decentration of a positive lens.

The ratio of prism optical power to liquid lens optical power is controlled by locating the pivot points 31 closer to or farther from the actuation point 32. The closer the pivot points 31 are to the actuation point 32, the greater will be the prismatic effect as compared to the lens power effect for a given motion of the actuation mechanism 20 or 30. It is noted that the effect of squeezing at point 32 is the same as a separating force applied between the membrane support and the fixed lens at point 33 (adjacent the nose), which may be a more convenient place to apply the actuating force. If it is desired to compensate as well for vertical decentration of the liquid lenses, the pivot and squeeze points 31 and 32 (or 33) can be moved clockwise or counterclockwise so that the prism axis will rotate to the desired angle as required.

What has been described is a novel variable focal length lens suitable for use in spectacles. The invention has been explained in connection with two embodiments, but various modifications and other embodiments within the spirit of the following claims will no doubt occur to those skilled in the art. Such modifications and other embodiments are intended to be covered hereby.

I claim:

1. A variable focal length lens which comprises:
   a first rigid lens;
   a membrane support comprised of a second rigid lens spaced from said first rigid lens;

flexible sealing means extending between said first rigid lens and said membrane support allowing relative motion between said first rigid lens and said membrane support;

a transparent elastomeric membrane outboard of said membrane support, and positioned across the fields of view of said rigid lenses and sealed around its periphery to said membrane support;

a transparent liquid filling the space between said first rigid lens and said membrane;

means for ducting said transparent liquid from one side of said second rigid lens to the other; and means for varying the spacing between said membrane support and said first rigid lens.

2. A variable focal length lens as recited in claim 1 wherein said means for varying the spacing between said membrane support and said first rigid lens varies the spacing between the periphery of said first rigid lens and the periphery of said membrane support, the variation in spacing not being the same at all points around the periphery.

3. A variable focal length lens as recited in claim 1 wherein said membrane is fabricated from saran.

4. A variable focal length lens as recited in claim 1 where said means for ducting comprises holes through said second rigid lens.

5. A variable focal length lens as recited in claim 1 where tension in said membrane creates a force tending to separate said first rigid lens and said membrane support.

6. A variable focal length lens which comprises:
a first rigid lens;
a membrane support spaced from said first rigid lens;
flexible sealing means extending between said first rigid lens and said membrane support allowing relative motion between said first rigid lens and said membrane support;
a transparent membrane positioned across the field of view of said first rigid lens and sealed around its periphery to said membrane support;
a transparent liquid filling the space between said first rigid lens and said membrane; and
means for varying the angle between a plane through said membrane support and a plane through said first rigid lens.

7. A variable focal length lens as recited in claim 6 where said angle is variable between a first value and a second value, and both the optical power and the prismatic power of said variable focal length lens vary as said angle is varied.

8. A variable focal length lens as recited in claim 6 where said membrane is an elastomer.

9. A variable focal length lens as recited in claim 8 where said elastomer is saran.

10. A variable focal length lens as recited in claim 6 where said membrane support is in the form of an annular ring.

11. A variable focal length lens as recited in claim 6 where said membrane support is in the form of a second rigid lens.

12. A variable focal length lens which comprises:
a first rigid lens;
a membrane support comprised of a rigid annular rim spaced from said first rigid lens;
flexible sealing means extending between said first rigid lens and said membrane support allowing relative motion between said first rigid lens and said membrane support;
a transparent elastomeric membrane positioned across the field of view of said first rigid lens and sealed around its periphery to said membrane support;
a transparent liquid filling the space between said first rigid lens and said membrane; and
means for varying the spacing between said membrane support and said first rigid lens, the variation in said spacing not being the same at all points around the periphery.

13. A variable focal length lens as recited in claim 12 wherein said membrane is fabricated from saran.

14. A variable focal length lens as recited in claim 12 and further including pivoting means between said membrane support and said first rigid lens.

15. A variable focal length lens as recited in claim 14 and further including means for applying a force between said membrane support and said first rigid lens remote from said pivoting means to cause said membrane support to pivot with respect to said first rigid lens.

16. A variable focal length lens which comprises:
a rigid lens;
a membrane support spaced from said rigid lens;
flexible sealing means extending between said rigid lens and said membrane support allowing relative motion between said rigid lens and said membrane support;
a transparent elastomeric membrane positioned across the field of view of said rigid lens and sealed around its periphery to said membrane support;
a transparent liquid filling the space between said rigid lens and said membrane forming a liquid lens; and
means for causing relative motion between said membrane support and said rigid lens whereby the optical power of said liquid lens changes, and simultaneously its prismatic power changes.

17. A variable focal length lens as recited in claim 16 and further including pivoting means joining said membrane support and said rigid lens.

18. A variable focal length lens as recited in claim 17 and further including means for applying a force between said membrane support and said rigid lens remote from said pivoting means to cause said membrane support to pivot with respect to said rigid lens.

* * * * *